(12) United States Patent
Chi et al.

(10) Patent No.: US 11,016,714 B2
(45) Date of Patent: May 25, 2021

(54) MULTI-SCREEN SPLICING STRUCTURE AND DISPLAY DEVICE HAVING TRANSCEIVERS FOR DETECTING APPROACHING OF OTHER DISPLAYS

(71) Applicants: BenQ Intelligent Technology (Shanghai) Co., Ltd, Shanghai (CN); BENQ CORPORATION, Taipei (TW)

(72) Inventors: Chin-Jui Chi, Taoyuan (TW); Ta-Wei Liu, Taoyuan (TW); Pei-Wen Huang, Taipei (TW)

(73) Assignees: BenQ Intelligent Technology (Shanghai) Co., Ltd; BENQ CORPORATION, Taipei (TW)

( * ) Notice: Subject to any disclaimer, the term of this patent is extended or adjusted under 35 U.S.C. 154(b) by 0 days.

(21) Appl. No.: 16/848,807

(22) Filed: Apr. 14, 2020

(65) Prior Publication Data

US 2020/0379705 A1 Dec. 3, 2020

(30) Foreign Application Priority Data

May 28, 2019 (CN) .......................... 201910451078.8

(51) Int. Cl.
*G06F 3/14* (2006.01)
(52) U.S. Cl.
CPC .......... *G06F 3/1446* (2013.01); *G06F 3/1431* (2013.01); *G09G 2300/026* (2013.01)
(58) Field of Classification Search
CPC ................ G06F 3/1446; G06F 3/1431; G09G 2300/026

USPC .......................................................... 345/1.3
See application file for complete search history.

(56) References Cited

U.S. PATENT DOCUMENTS

| 8,823,640 | B1 * | 9/2014 | Harris ................... | G06F 3/1438 |
| | | | | 345/156 |
| 9,235,373 | B2 * | 1/2016 | Toren ..................... | G06F 3/1423 |
| 2013/0271352 | A1 * | 10/2013 | Wu ......................... | G06F 1/1684 |
| | | | | 345/1.1 |

(Continued)

FOREIGN PATENT DOCUMENTS

| EP | 3 262 855 A1 | 1/2018 |
| EP | 3 376 366 A1 | 9/2018 |

(Continued)

*Primary Examiner* — Tom V Sheng
(74) *Attorney, Agent, or Firm* — Winston Hsu

(57) ABSTRACT

A multi-screen splicing structure has a plurality of display devices. Each display device includes a display panel, a plurality of transceivers, a wireless communications module, and a control circuit. Each transceiver has a transmitting component and a receiving component. The control circuit is coupled to the display panel, the transceivers and the wireless communications module, and is used to turn on the wireless communications module when the control circuit determines that another display device is approaching based on a status of signals received by the receiving components of the transceivers to enable the wireless communications module performing wireless communications with a wireless communications module of another display device. The control circuit may also control an orientation of an image relative to the display panel according to the status of signals received by the receiving components of the transceivers of the display device.

14 Claims, 9 Drawing Sheets

(56) References Cited

U.S. PATENT DOCUMENTS

| | | | | |
|---|---|---|---|---|
| 2014/0002327 | A1* | 1/2014 | Toren | G06F 3/1423 |
| | | | | 345/1.1 |
| 2014/0315489 | A1* | 10/2014 | Lee | H04W 4/80 |
| | | | | 455/41.2 |
| 2015/0254045 | A1 | 9/2015 | Drake | |
| 2015/0338943 | A1* | 11/2015 | Donnelly | G06F 3/04162 |
| | | | | 345/173 |
| 2016/0026424 | A1 | 1/2016 | Chen | |
| 2016/0163018 | A1* | 6/2016 | Wang | G06T 1/20 |
| | | | | 345/504 |
| 2016/0224306 | A1 | 8/2016 | Rycyna, III | |
| 2017/0147272 | A1* | 5/2017 | DeLuca | G09G 5/003 |
| 2017/0192733 | A1* | 7/2017 | Huang | G06F 3/1446 |
| 2019/0034152 | A1* | 1/2019 | Jouad | G06F 3/1431 |
| 2019/0265939 | A1* | 8/2019 | Foster | G09G 3/32 |
| 2020/0012472 | A1* | 1/2020 | Chang | G09G 5/00 |
| 2020/0364020 | A1* | 11/2020 | Jones | G06F 3/1431 |
| 2020/0380905 | A1* | 12/2020 | Chi | H04N 21/4122 |

FOREIGN PATENT DOCUMENTS

| | | |
|---|---|---|
| TW | 201301003 A1 | 1/2013 |
| TW | M473015 U | 2/2014 |
| TW | 201506898 A | 2/2015 |
| TW | I647692 B | 1/2019 |

* cited by examiner

MULTI-SCREEN SPLICING STRUCTURE AND DISPLAY DEVICE HAVING TRANSCEIVERS FOR DETECTING APPROACHING OF OTHER DISPLAYS

BACKGROUND OF THE INVENTION

1. Field of the Invention

The present invention relates to a display device and a multi-screen splicing structure, and more particularly to a display device and a multi-screen splicing structure with a wireless communications module.

2. Description of the Prior Art

Display devices have been widely used in modern society to display images and information. With the increasing number of display devices, how to splice multiple display devices together to form a larger multi-screen splicing structure to display a larger image and present more information is currently an important topic in the industry.

SUMMARY OF THE INVENTION

An embodiment of the present invention discloses a multi-screen splicing structure, which comprises a plurality of display devices. Each display device comprises a display panel, a plurality of transceivers, a wireless communications module, and a control circuit. The display panel comprises a plurality of pixels for displaying an image. The transceivers are respectively arranged around the display panel. Each transceiver comprises a transmitting component and a receiving component. The transmitting component is configured to send signals, and the receiving component is configured to receive signals sent from transmitting components of transceivers of other display devices. The wireless communications module is configured to perform wireless communications with other display devices. The control circuit is coupled to the display panel, the transceivers, and the wireless communications module, and is configured to turn on the wireless communications module when the control circuit determines that another display device is approaching based on the status of signals received by receiving components of the transceivers of the each display device to enable the wireless communications module performing wireless communications with a wireless communications module of another display device.

Another embodiment of the present invention discloses a display device, which comprises a display panel, a plurality of transceivers, and a control circuit. The display panel comprises a plurality of pixels for displaying an image. The transceivers are respectively arranged around the display panel. Each transceiver comprises a transmitting component and a receiving component, the transmitting component is configured to send signals, and the receiving component is configured to receive signals sent from transmitting components of transceivers of other display devices. The control circuit is coupled to the display panel and the transceivers, and is configured to control an orientation of the image relative to the display panel according to the status of signals received by receiving components of the transceivers of the display device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
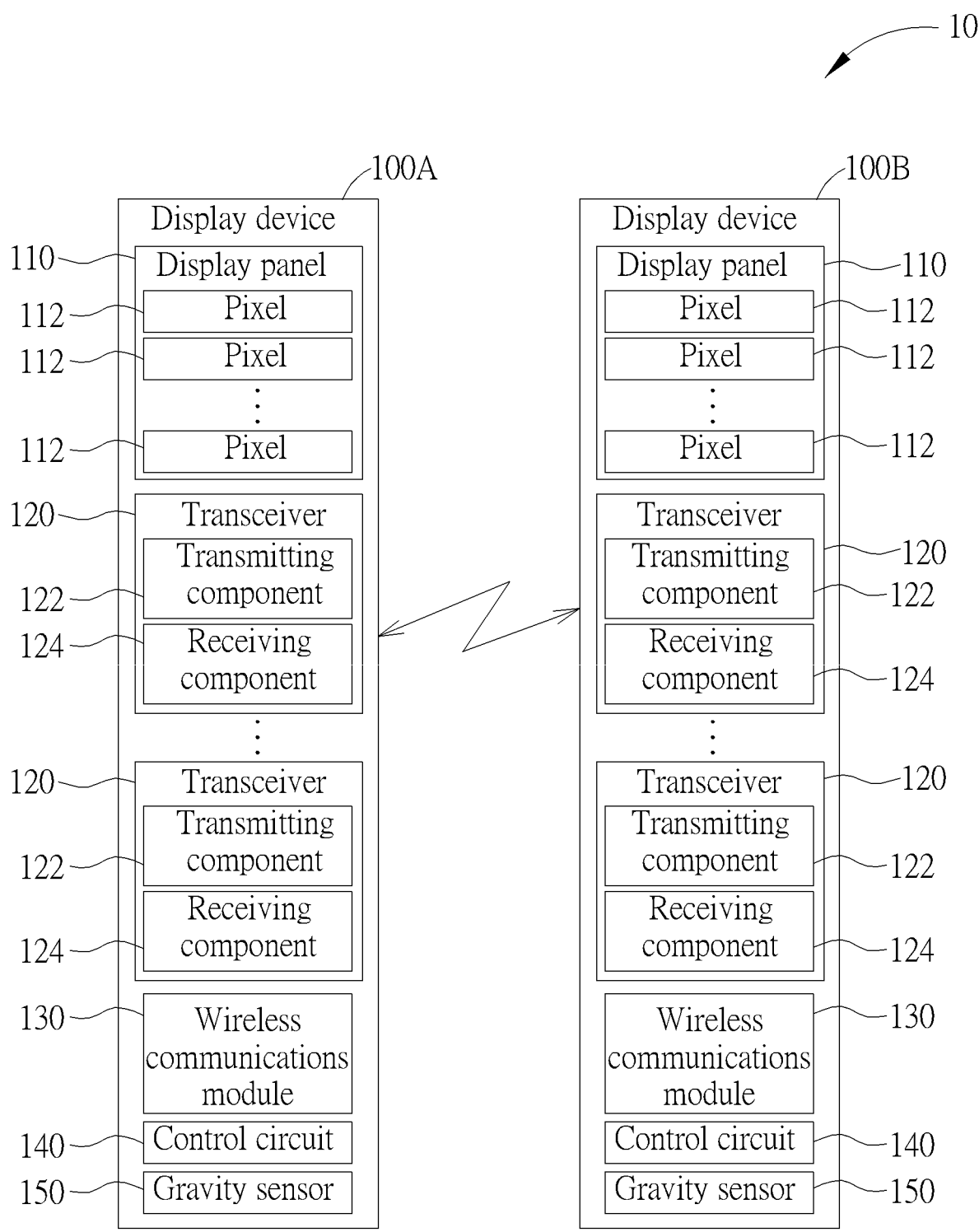
FIG. 1 is a functional block diagram of a multi-screen splicing structure according to an embodiment of the present invention.
Figure 2:
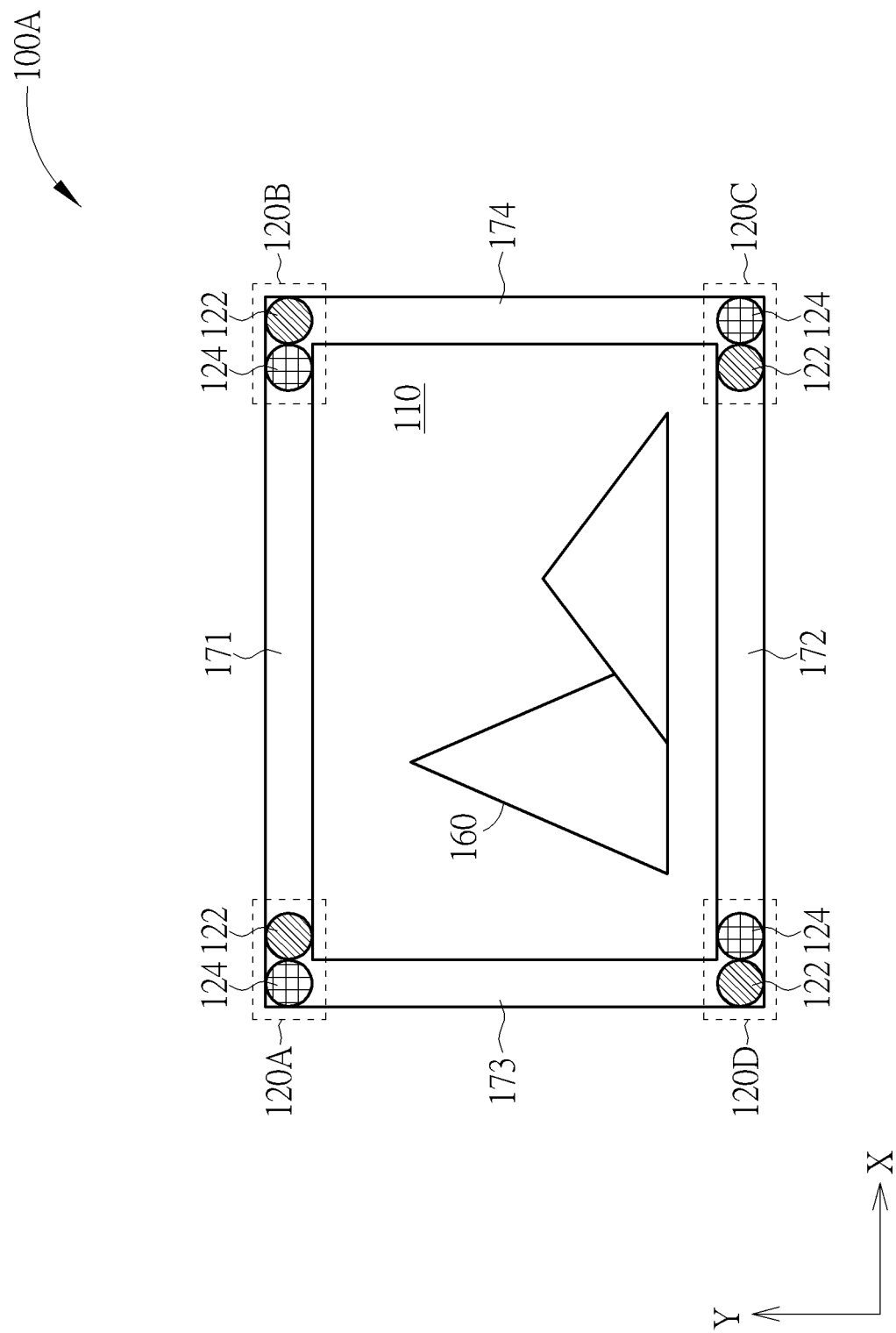
FIG. 2 is a schematic diagram showing a distribution of the transceivers of the display device in FIG. 1.

FIG. 1 is a functional block diagram of a multi-screen splicing structure 10 according to an embodiment of the present invention. FIG. 2 is a schematic diagram showing a distribution of transceivers 120A to 120D of a display device 100A of the multi-screen splicing structure 10 in FIG. 1. In the embodiment, the multi-screen splicing structure 10 comprises two display devices 100A and 100B. However, the number of the display devices of the present invention is not limited to two. A multi-screen splicing structure can be formed by splicing three or more display devices. The structures of the display device 100A and the display device 100B are substantially the same, and each of the display devices 100A and 100B comprises a display panel 110, a plurality of transceivers 120 (e.g., 120A to 120D), a wireless communications module 130, and a control circuit 140. The display panel 110 comprises a plurality of pixels 112 for displaying an image 160. The transceivers 120 are respectively disposed around the display panel 110. Taking the display device 100A in FIG. 2 as an example, the display device 100A comprises four transceivers 120, which are transceivers 120A to 120D respectively disposed around the display panel 110. However, the number of transceivers 120 of each display device 100A or 100B is not limited to four, but may be other numbers. Each transceiver 120, 120A, 120B, 120C or 120D comprises a transmitting component 122 and a receiving component 124. The transmitting component 122 is used to send signals, and the receiving component 124 is used to receive signals from the transmitting components 122 of transceivers 120 of other display devices. The wireless communications module 130 is used for performing wireless communications with other display devices. For example, the wireless communications module 130 of the display device 100A can perform wireless communications with the wireless communications module 130 of the display device 100B. The control circuit 140 is coupled to the display panel 110, each of the transceivers 120 (e.g., 120A to 120D) and the wireless communications module 130. The control circuit 140 may determine whether another display device is approaching based on the status of signals received by the receiving components 124 of the transceivers 120 (e.g., 120A to 120D). When the control circuit 140 of the display device 100A determines that the display device 100B is approaching based on the status of signals received by the receiving components 124 of the transceivers 120 of the display device 100A, the control circuit 140 of the display device 100A may turn on the wireless communications module 130 of the display device 100A to enable the wireless communications module 130 of the display device 100A performing wireless communications with the wireless communications module 130 of the display device 100B. Similarly, when the control circuit 140 of the display device 100B determines that the display device 100A is approaching based on the status of signals received by the receiving components 124 of the transceivers 120 of the display device 100B, the control circuit 140 of the display device 100B may turn on the wireless communications module 130 of the display device 100B to enable the wireless communications module 130 of the display device 100B performing wireless communications with the wireless communications module 130 of the display device 100A. The wireless communications module 130 may be a Wi-Fi module or a Bluetooth module, and the transceivers 120 are selected from a group consisting of Hall transceivers, infrared transceivers, laser transceivers, and ultrasonic transceivers.

When the display devices 100A and 100B perform wireless communications through their respective wireless communications modules 130, the display devices 100A and 100B can share images, data, files, and information with each other. For example, the control circuit 140 of the display device 100A may transmit the image displayed on the display panel 110 to the display device 100B through the wireless communications module 130 of the display device 100A. Therefore, the control circuit 140 of the display device 100B would receive the image of the display device 100A via the wireless communications module 130 of the display device 100B to control the pixels 112 of the display panel 110 of the display device 100B to display the received image.

As shown in FIG. 2, the transceivers 120A to 120D are respectively disposed at four corners of the display panel 100A. The transceiver 120A and transceiver 120B are disposed at two different ends of a first side 171 of display panel 100A, the transceivers 120C and 120D are disposed at two different ends of a second side 172 of display panel 110, the transceivers 120A and 120D are disposed at the two different ends of a third side 173 of the display panel 110, and the transceivers 120B and 120C are disposed at two different ends of a fourth side 174 of the display panel 110. In addition, the first side 171 is opposed to the second side 172, and the third side 173 is opposed to the fourth side 174. The first side 171 and the second side 172 are parallel to an X axis, and the third side 173 and the fourth side 174 are parallel to a Y axis. In addition, the arrangement order of the transmitting component 122 and the receiving component 124 of the transceiver 120A on the first side 171 along the X axis is the same as the arrangement order of the transmitting component 122 and the receiving component 124 of the transceiver 120B on the first side 171 along the X axis. The arrangement order of transmitting component 122 and receiving component 124 of transceiver 120C on the second side 172 along the X axis is the same as the arrangement order of transmitting component 122 and receiving component 124 of transceiver 120D on the second side 172 along the X axis. In addition, the arrangement order of transmitting component 122 and receiving component 124 of transceiver 120A on the first side 171 along the X axis is opposite to the arrangement order of transmitting component 122 and receiving component 124 of transceiver 120C on the second side 172 along the X axis.

Figure 3:
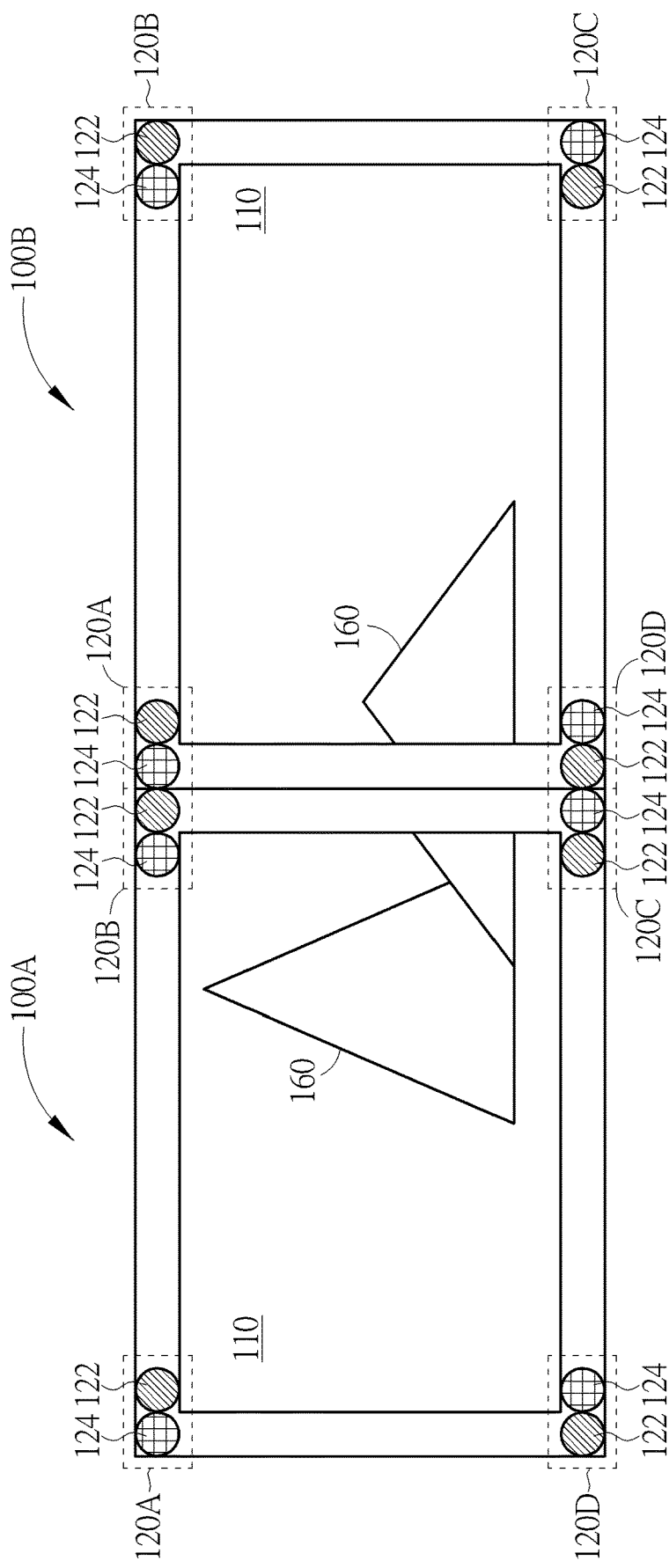
FIG. 3 is a schematic diagram illustrating a method of the display device in FIG. 2 splicing with another display device.
Figure 4:
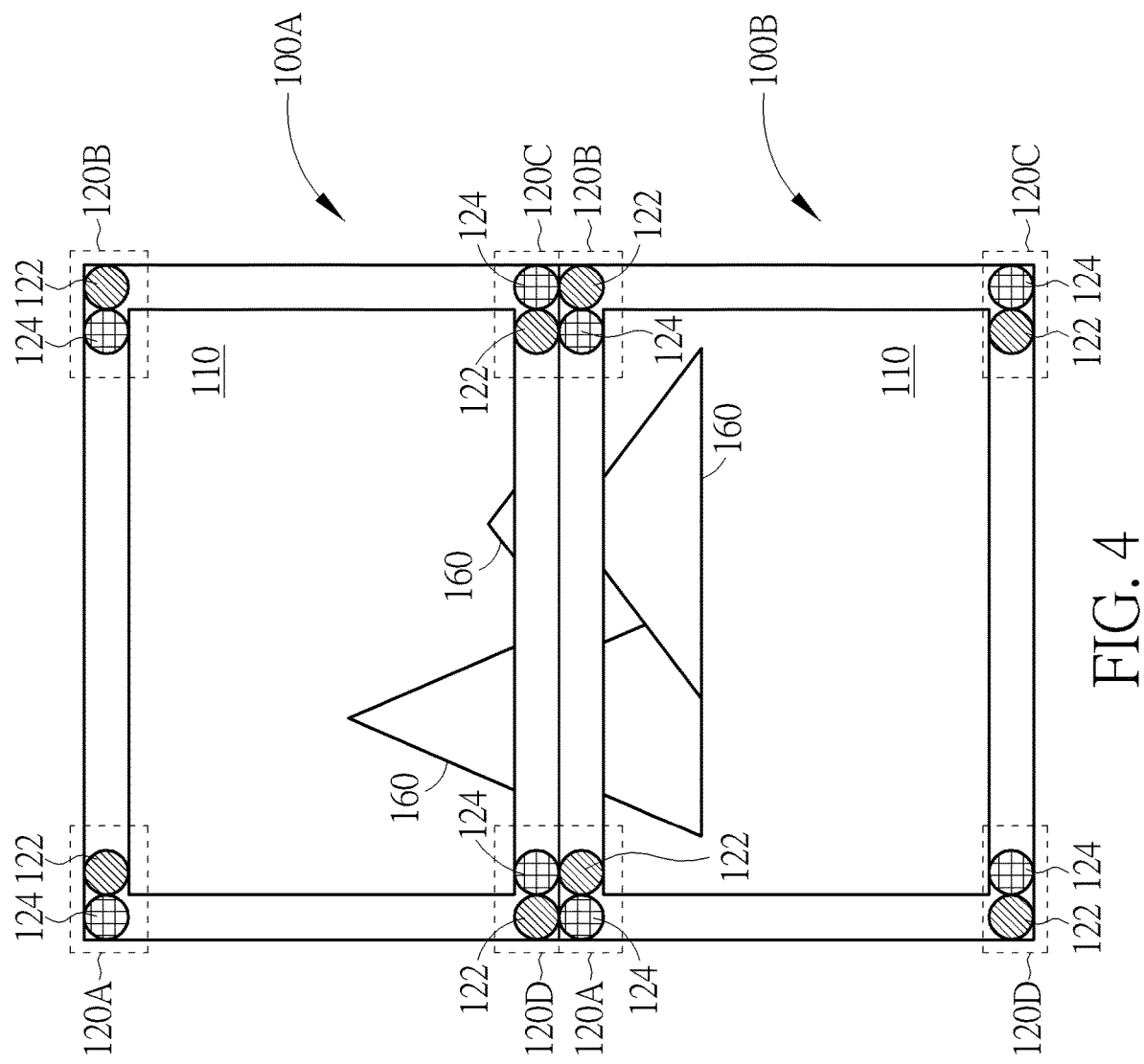
FIG. 4 is a schematic diagram illustrating another method of the display device in FIG. 2 splicing with another display device.

In an embodiment of the present invention, the control circuit 140 may control an orientation of the image 160 relative to the display panel 110 according to the status of signals received by transceivers 120 (or 120A to 120D). FIG. 3 is a schematic diagram illustrating a method of the display device 100A in FIG. 2 splicing with another display device 100B. FIG. 4 is a schematic diagram illustrating another method of the display device 100A in FIG. 2 splicing with another display device 100B. In the embodiment of FIG. 3, when the control circuit 140 of the display device 100A detects the approach of the display device 100B via the transceivers 120B and 120C of the display device 100A, and the control circuit 140 of the display device 100B detects the approach of the display device 100A via the transceivers 120A and 120D of the display device 100B, the control circuits 140 of display devices 100A and 100B would respectively determine a splicing mode of the display devices 100A and 100B, and control the respective display panels 110 to display the image 160 in a landscape mode, and determine an orientation of the image 160 relative to the display panels 110. In the embodiment of FIG. 4, when the control circuit 140 of the display device 100A detects the approach of the display device 100B via the transceivers 120C and 120D of the display device 100A, and the control circuit 140 of the display device 100B detects the approach of the display device 100A via the transceivers 120A and 120B of the display device 100B, the control circuits 140 of display devices 100A and 100B would respectively determine a splicing mode of the display devices 100A and 100B, and control the respective display panels 110 to display the image 160 in a portrait mode, and determine an orientation of the image 160 relative to the display panels 110. In addition, as shown in FIGS. 3 and 4, each of the two display panels 110 may display only a part of the image 160.

Figure 5:
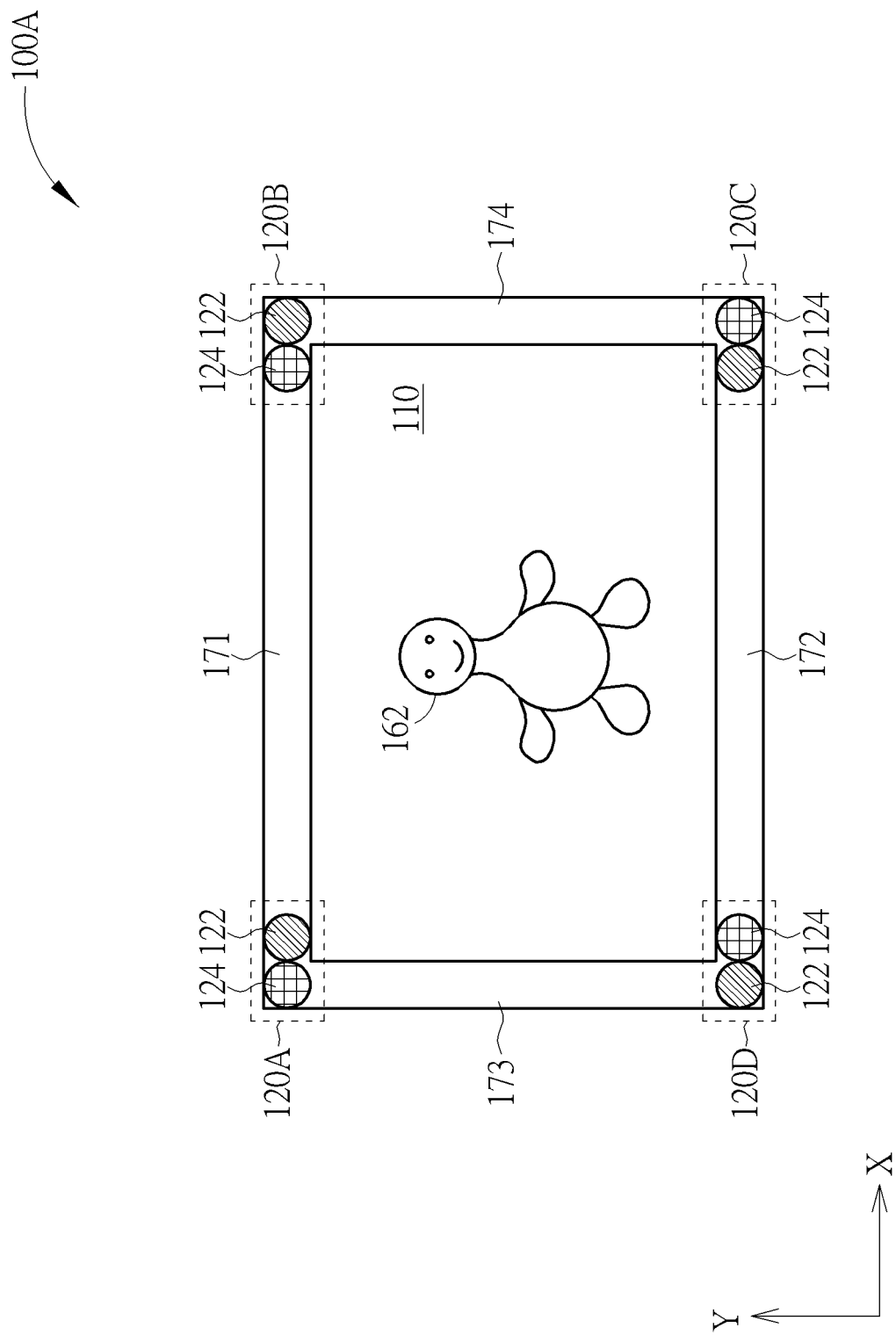
FIG. 5 is a schematic diagram when the display device in FIG. 2 displays an image.
Figure 6:
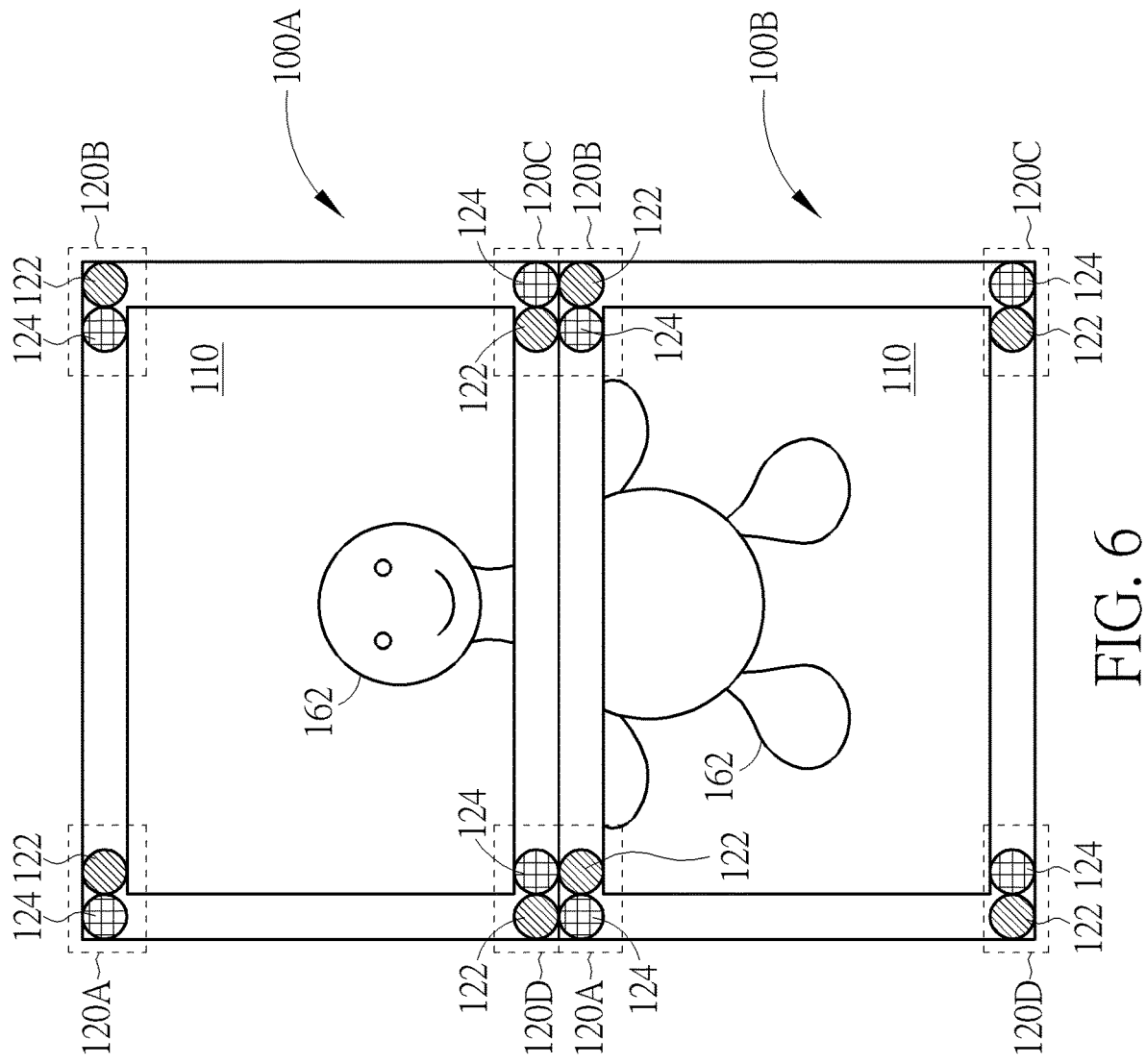
FIG. 6 is a schematic diagram when the display device in FIG. 2 and another display device display the image displayed on the display in FIG. 5.

FIG. 5 is a schematic diagram when the display device 100A of FIG. 2 displays the image 162, and FIG. 6 is a schematic diagram when the display device 100A of FIG. 2 and the display device 100B display the image 162 displayed on the display 100A in FIG. 5. The image 162 shows a humanoid doll. When the control circuit 140 of the display device 100A detects the approach of the display device 100B via the transceivers 120C and 120D of the display device 100A, and the control circuit 140 of the display device 100B detects the approach of the display device 100A via the transceivers 120A and 120B of the display device 100A, the control circuits 140 of display devices 100A and 100B would respectively determine a splicing mode of the display devices 100A and 100B, and control the respective display panels 110 to display the image 162 in the portrait mode, and determine an orientation of the image 162 relative to the display panels 110. In addition, as shown in FIG. 6, each of the two display panels 110 may display only a part of the image 162.

Figure 7:
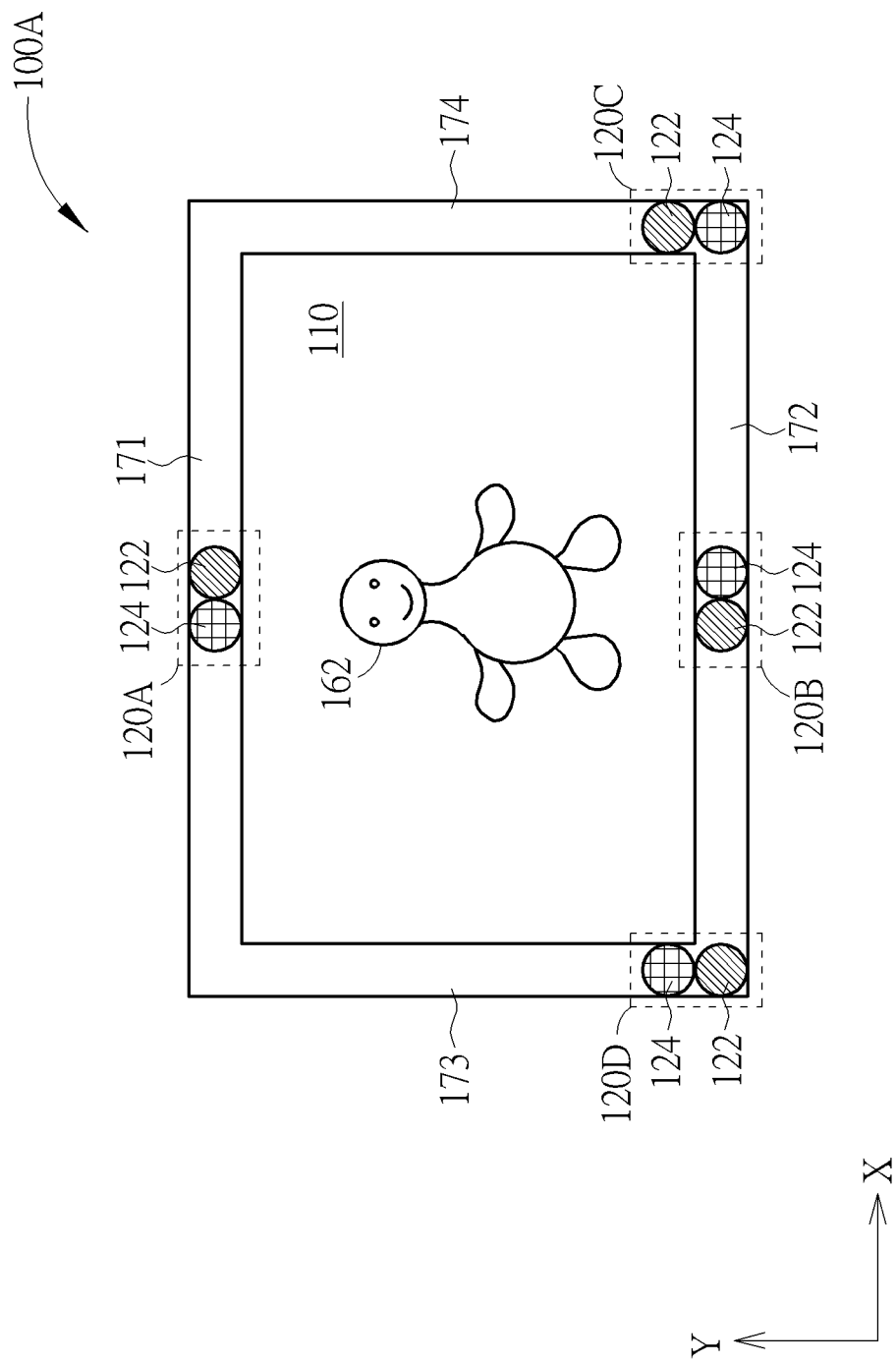
FIG. 7 is a schematic diagram showing another distribution of the transceivers of the display device in FIG. 1.

FIG. 7 is a schematic diagram showing another distribution of the transceivers 120 of the display device 100A in FIG. 1. In the embodiment, the transceiver 120A is disposed in the middle of the first side 171 of the display panel 110, the transceiver 120B is disposed in the middle of the second side 172 of the display panel 110, and the second side 172 is opposite to the first side 171. The transceiver 120C and the transceiver 120D are disposed at two different ends of the second side 172. Furthermore, the transceiver 120C is disposed at a corner where the second side 172 joins a fourth side 174 of the display panel 110, and the transceiver 120D is disposed at a corner where the second side 172 joins a third side 173 of the display panel 110. The third side 173 is opposite to the fourth side 174. In addition, the arrangement order of the transmitting component 122 and the receiving component 124 of the transceiver 120A on the first side 171 along the X axis is opposite to the arrangement order of the transmitting component 122 and the receiving component 124 of the transceiver 120B on the second side 172 along the X axis. In addition, the arrangement order of transmitting component 122 and receiving component 124 of transceiver 120C on the fourth side 174 along the Y axis is opposite to the arrangement order of transmitting component 122 and receiving component 124 of transceiver 120D on the third side 173 along the Y axis.

Figure 8:
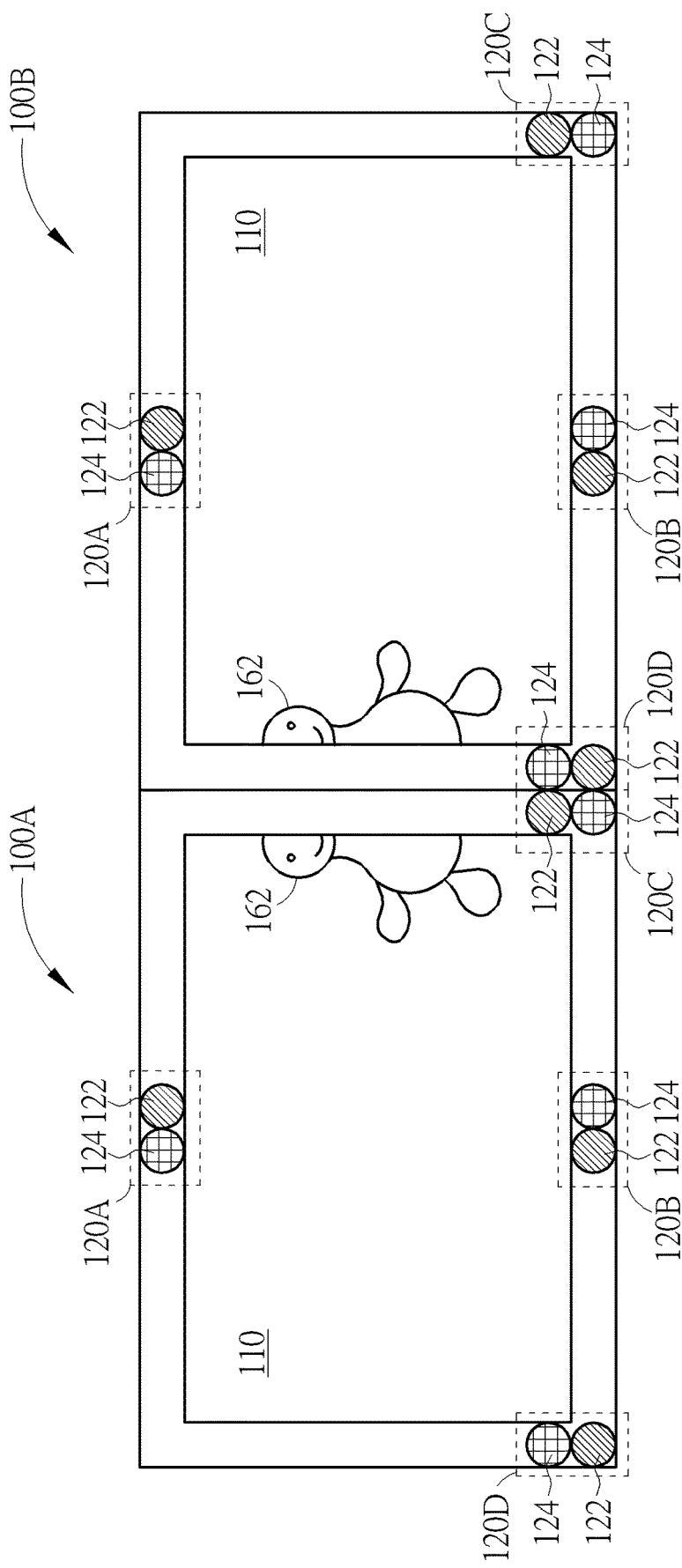
FIG. 8 is a schematic diagram when the display device in FIG. 7 and another display device display the image displayed on the display in FIG. 7.
Figure 9:
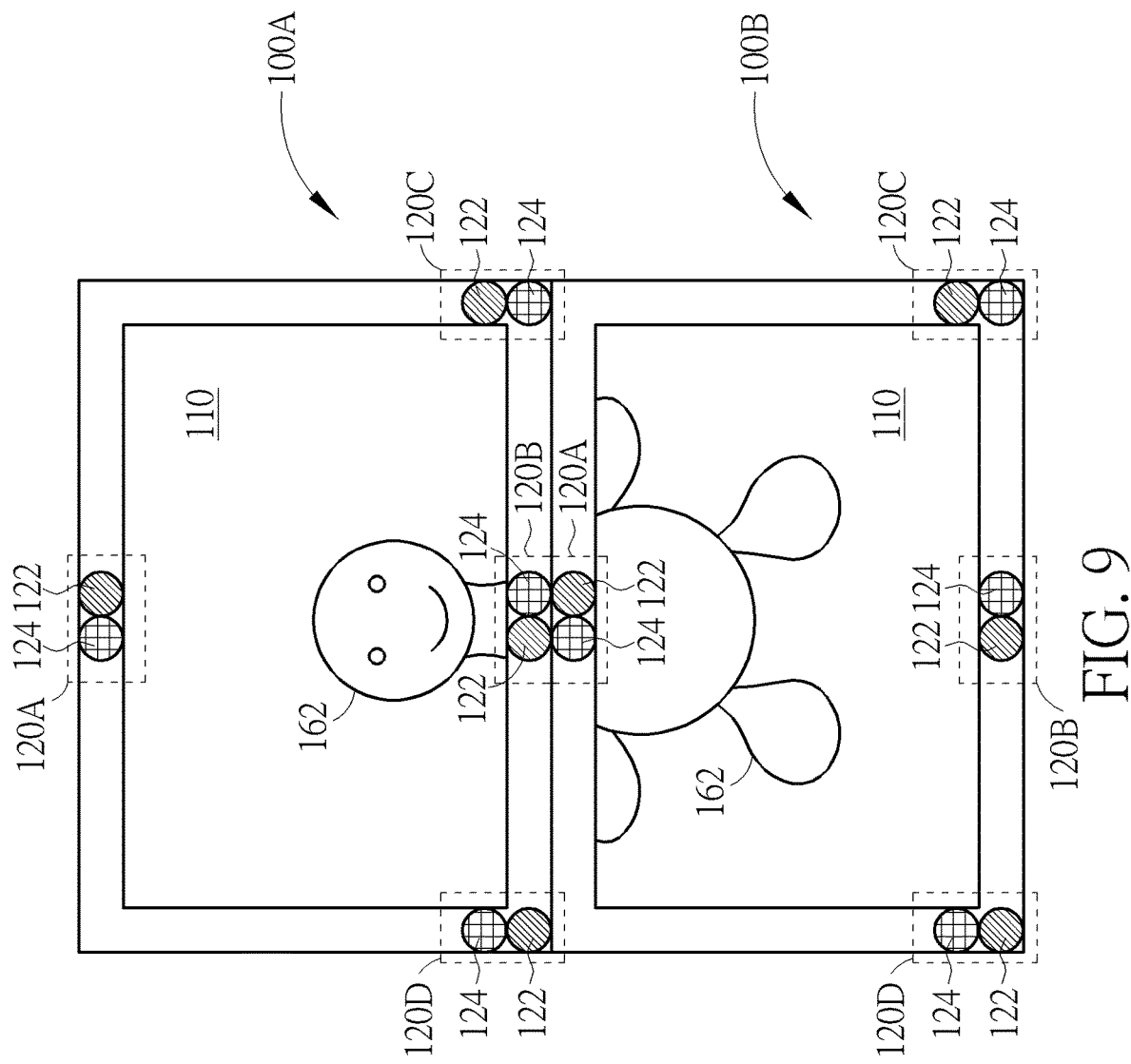
FIG. 9 is a schematic diagram when the display device in FIG. 7 and another display device display the image displayed on the display in FIG. 7 in another embodiment.

Similarly, in this embodiment, the control circuit 140 may control the orientation of the image 162 displayed on the display panel 110 relative to the display panel 110 according to the status of signals received by receiving components 124 of the transceivers 120 (or 120A to 120D) of the display device 100A or 100B. FIG. 8 is a schematic diagram illustrating a method of the display device 100A in FIG. 7 splicing with the display device 100B, and FIG. 9 is a schematic diagram illustrating another method of the display device 100A in FIG. 7 splicing with the display device 100B. In the embodiment of FIG. 8, when the control circuit 140 of the display device 100A detects the approach of the display device 100B via the transceiver 120C of the display device 100A, and the control circuit 140 of the display device 100B detects the approach of the display device 100A via the transceiver 120D of the display device 100B, the control circuits 140 of the display devices 100A and 100B would respectively determine a splicing mode of the display devices 100A and 100B, and control the respective display panels 110 to display the image 162 in a landscape mode, and determine an orientation of the image 162 relative to the display panels 110. In the embodiment of FIG. 9, when the control circuit 140 of the display device 100A detects the approach of the display device 100B via the transceiver 120B of the display device 100A, and the control circuit 140 of the display device 100B detects the approach of the display device 100A via the transceiver 120A of the display device 100B, the control circuits 140 of display devices 100A and 100B would respectively determine a splicing mode of the display devices 100A and 100B, and control the respective display panels 110 to display the image 162 in a portrait mode, and determine an orientation of the image 162 relative to the display panels 110. In addition, as shown in FIGS. 8 and 9, each of the two display panels 110 may display only a part of the image 162.

In another embodiment of the present invention, the display devices 100A and 100B may further comprise a gravity sensor (G sensor) 150 respectively. The control circuit 140 may control the orientation of the image 160 or 162 relative to the display panel 110 according to an output signal of the gravity sensor 150 and the status of signals received by the receiving components 124 of the transceivers 120 of each display device 100A, 100B.

In summary, each control circuit in the multi-screen splicing structure of the present invention can determine whether another display device is approaching based on the status of signals received by the receiving components of the transceivers. When it is determined that another display device is approaching, the control circuit can enable the wireless communications module performing wireless communications with the wireless communications module of another display device via the wireless communications module. Furthermore, the control circuit can also control the orientation of the image displayed on the display panel relative to the display panel based on the status of signals received by the receiving components of the transceivers. Accordingly, when multiple display devices are spliced, it would be more convenient for the users to use the multi-screen splicing structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-screen splicing structure comprising a plurality of display devices, and each display device comprising:
   a display panel comprising a plurality of pixels for displaying an image;
   a plurality of transceivers respectively arranged around the display panel, each transceiver comprising a transmitting component and a receiving component, the transmitting component being configured to send signals, and the receiving component being configured to receive signals sent from transmitting components of transceivers of other display devices;
   a wireless communications module for performing wireless communications with other display devices; and
   a control circuit coupled to the display panel, the transceivers, and the wireless communications module, and configured to turn on the wireless communications module when the control circuit determines that another display device is approaching based on a status of signals received by receiving components of the transceivers of the each display device to enable the wireless communications module performing wireless communications with a wireless communications module of another display device;
   wherein the plurality of transceivers of the each display device are a first transceiver, a second transceiver, a third transceiver, and a fourth transceiver, the first transceiver and the second transceiver are disposed at two different ends of a first side of the display panel, the third transceiver and the fourth transceiver are disposed at two different ends of a second side of the display panel, the first transceiver and the fourth transceiver are disposed at two different ends of a third side of the display panel, the second transceiver and the third transceiver are disposed at two different ends of a fourth side of the display panel, the second side is opposite to the first side, and the fourth side is opposite to the third side;
   an arrangement order of a transmitting component and a receiving component of the first transceiver on the first side is the same as an arrangement order of a transmitting component and a receiving component of the second transceiver on the first side;
   an arrangement order of a transmitting component and a receiving component of the third transceiver on the second side is the same as an arrangement order of a transmitting component and a receiving component of the fourth transceiver on the second side; and the arrangement order of the transmitting component and the receiving component of the first transceiver on the first side is opposite to the arrangement order of the transmitting component and the receiving component of the third transceiver on the second side.

2. The multi-screen splicing structure of claim 1, wherein the wireless communications module is a Wi-Fi module or a Bluetooth module.

3. The multi-screen splicing structure of claim 1, wherein the control circuit is further configured to control an orientation of the image relative to the display panel according to a status of signals received by the receiving components of the transceivers of the each display device.

4. The multi-screen splicing structure of claim 1 further comprising a gravity sensor (G sensor), wherein the control circuit is further configured to control an orientation of the image relative to the display panel according to a status of signals received by the receiving components of the transceivers of the each display device and an output signal of the gravity sensor.

5. The multi-screen splicing structure of claim 1, wherein the control circuit is further configured to control the display panel to display only a part of the image according to a status of the signals received by the receiving components of the transceivers of the each display device.

6. The multi-screen splicing structure of claim 1, wherein the transceivers are selected from a group consisting of Hall transceivers, infrared transceivers, laser transceivers, and ultrasonic transceivers.

7. A multi-screen splicing structure comprising a plurality of display devices, and each display device comprising:
a display panel comprising a plurality of pixels for displaying an image;
a plurality of transceivers respectively arranged around the display panel, each transceiver comprising a transmitting component and a receiving component, the transmitting component being configured to send signals, and the receiving component being configured to receive signals sent from transmitting components of transceivers of other display devices;
a wireless communications module for performing wireless communications with other display devices; and
a control circuit coupled to the display panel, the transceivers, and the wireless communications module, and configured to turn on the wireless communications module when the control circuit determines that another display device is approaching based on a status of signals received by receiving components of the transceivers of the each display device to enable the wireless communications module performing wireless communications with a wireless communications module of another display device;
wherein the transceivers of the each display device comprise:
a first transceiver disposed in the middle of a first side of the display panel;
a second transceiver disposed in the middle of a second side of the display panel, the second side being opposite to the first side;
a third transceiver disposed at a first end of the second side; and
a fourth transceiver disposed at a second end of the second side different from the first end.

8. The multi-screen splicing structure of claim 7, wherein the third transceiver is disposed at a corner where the second side joins a third side of the display panel, the fourth transceiver is disposed at a corner where the second side of the display panel joins a fourth side of the display panel, and the third side is opposite to the fourth side;
an arrangement order of a transmitting component and a receiving component of the first transceiver on the first side is opposite to an arrangement order of a transmitting component and a receiving component of the second transceiver on the second side; and
an arrangement order of a transmitting component and a receiving component of the third transceiver on the third side is opposite to an arrangement order of a transmitting component and a receiving component of the fourth transceiver on the fourth side.

9. A display device comprising:
a display panel comprising a plurality of pixels for displaying an image;
a plurality of transceivers respectively arranged around the display panel, each transceiver comprising a transmitting component and a receiving component, the transmitting component being configured to send signals, and the receiving component being configured to receive signals sent from transmitting components of transceivers of other display devices; and
a control circuit coupled to the display panel and the transceivers, and configured to control an orientation of the image relative to the display panel according to a status of signals received by receiving components of the transceivers of the display device;
wherein the plurality of transceivers are a first transceiver, a second transceiver, a third transceiver, and a fourth transceiver, the first transceiver and the second transceiver are disposed at two different ends of a first side of the display panel, the third transceiver and the fourth transceiver are disposed at two different ends of a second side of the display panel, the first transceiver and the fourth transceiver are disposed at two different ends of a third side of the display panel, the second transceiver and the third transceiver are disposed at two different ends of a fourth side of the display panel, the second side is opposite to the first side, and the fourth side is opposite to the third side;
an arrangement order of a transmitting component and a receiving component of the first transceiver on the first side is the same as an arrangement order of a transmitting component and a receiving component of the second transceiver on the first side;
an arrangement order of a transmitting component and a receiving component of the third transceiver on the second side is the same as an arrangement order of a transmitting component and a receiving component of the fourth transceiver on the second side; and
the arrangement order of the transmitting component and the receiving component of the first transceiver on the first side is opposite to the arrangement order of the transmitting component and the receiving component of the third transceiver on the second side.

10. The display device of claim 9, wherein the control circuit is further configured to control the display panel to display only a part of the image according to the status of the signals received by the receiving components of the transceivers of the display device.

11. The display device of claim 9, wherein the transceivers are selected from a group consisting of Hall transceivers, infrared transceivers, laser transceivers, and ultrasonic transceivers.

12. The display device of claim 9, further comprising a wireless communications module for performing wireless communications with other display devices.

13. The display device of claim 12, wherein the wireless communications module is a Wi-Fi module or a Bluetooth module.

14. The display device of claim 9, further comprising a gravity sensor, wherein the control circuit further controls the orientation of the image relative to the display panel based on an output signal of the gravity sensor.

* * * * *